July 4, 1967  G. DE COOMAN  3,329,084
THREE-ROLL MILL

Filed Sept. 8, 1965  6 Sheets-Sheet 1

INVENTOR.
GASTON De COOMAN
BY
AGENT

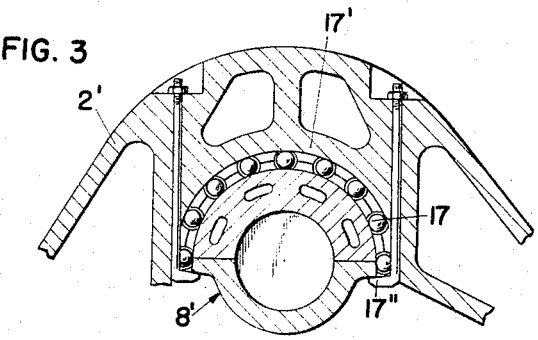
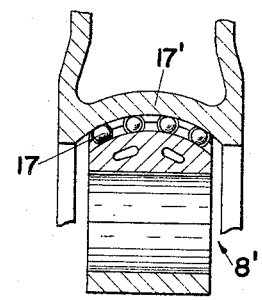
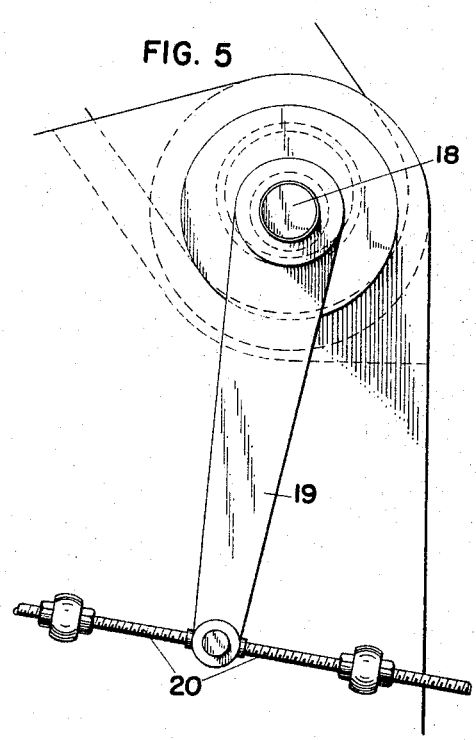
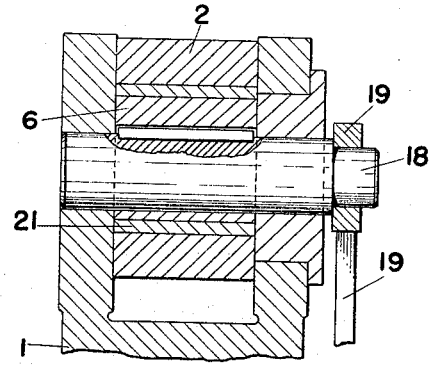
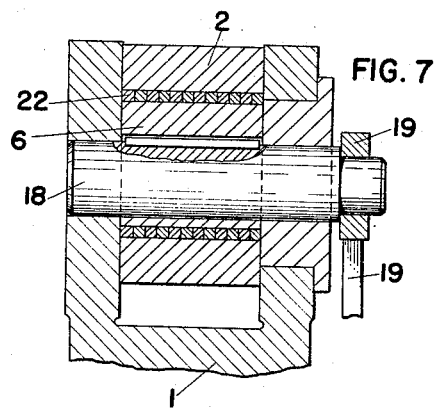

July 4, 1967    G. DE COOMAN    3,329,084
THREE-ROLL MILL
Filed Sept. 8, 1965    6 Sheets-Sheet 5
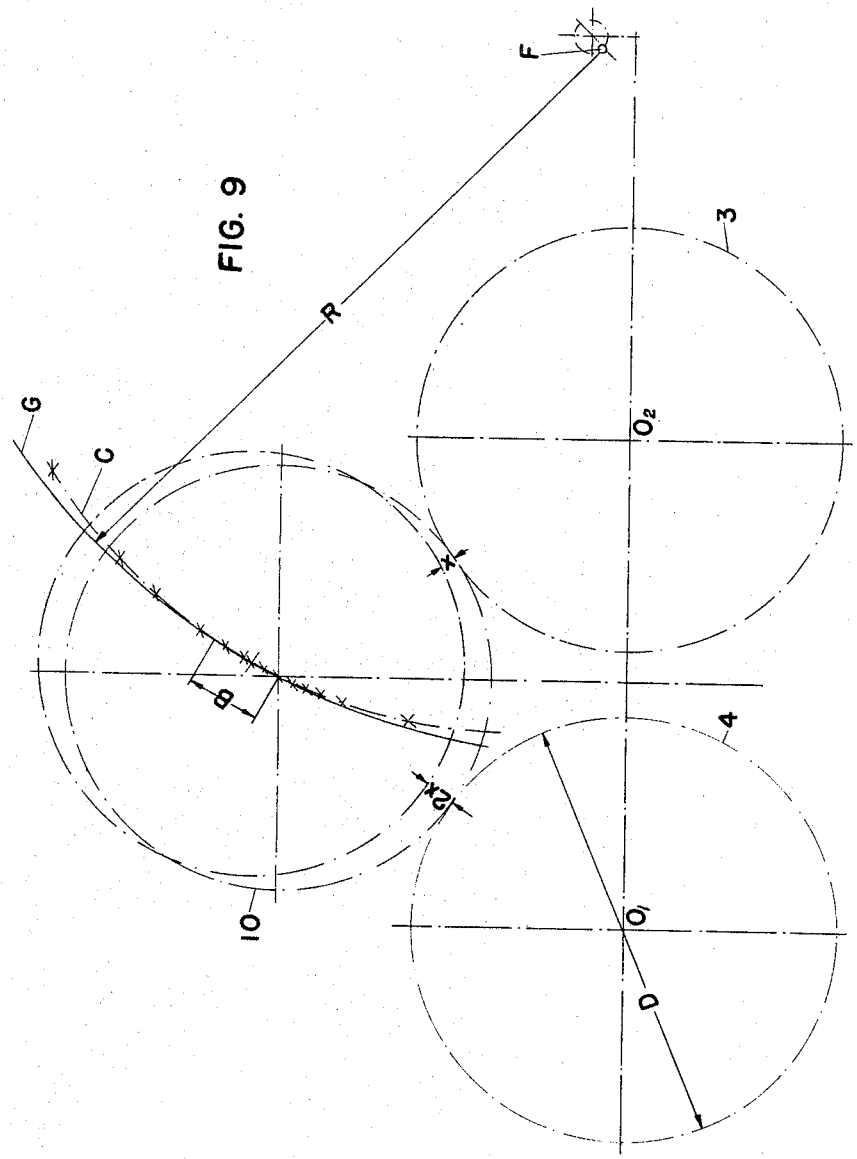
INVENTOR.
GASTON De COOMAN
BY
*Kurt Kelman*
AGENT

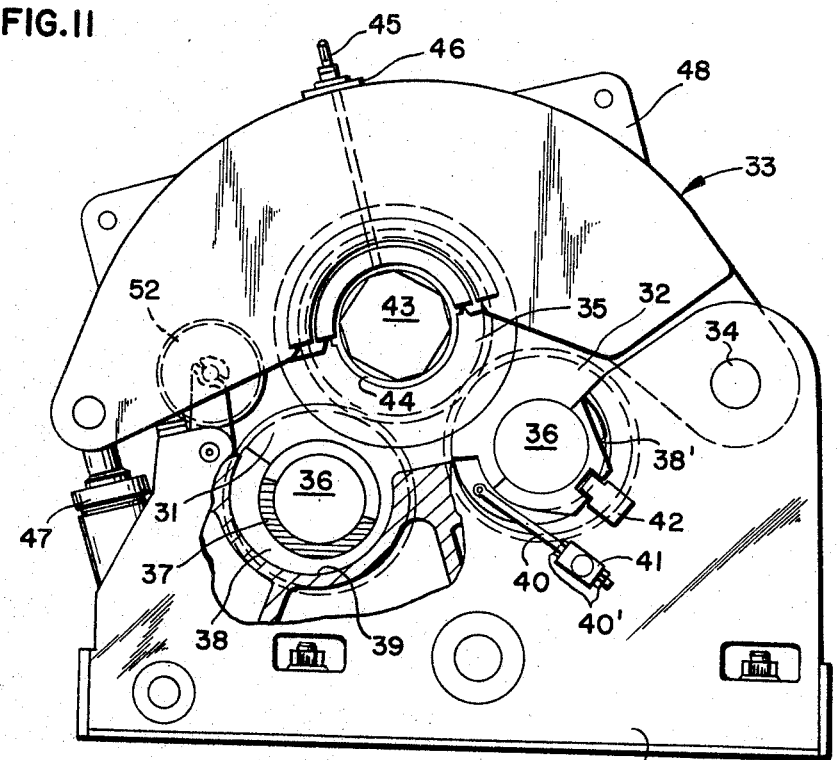

United States Patent Office 3,329,084
Patented July 4, 1967

3,329,084
THREE-ROLL MILL
Gaston De Cooman, Hellemmes, Nord, France, assignor to Fives Lille-Cail, Paris, France
Filed Sept. 8, 1965, Ser. No. 492,967
Claims priority, application France, July 13, 1962, 903,899, Patent 1,343,529; Jan. 28, 1965, 3,535
32 Claims. (Cl. 100—165)

This application is a continuation-in-part of my co-pending application Ser. No. 286,990, filed on June 11, 1963, now abandoned.

This invention relates to a three-roll mill of the type employed in the extraction of sugar juice from sugar cane, but not limited to this application.

Conventional cane mills have two rigid, upright, lateral frames in which the axial ends of three rollers are journaled. The axes of rotation of two rolls extend in a common horizontal plane. The third roll is movably mounted on a higher level and equipped with pressure fluid operated motors which urge the upper roll toward the two lower ones so that the sugar can or other material to be extracted is passed under pressure first through a gap between the top roll and one of the lower rolls, usually referred to as the feed roll, and thereafter through the gap between the top roll and the other lower roll, commonly called the bagasse roll.

The axis of the top roll normally is located in a vertical plane passing between the two lower rolls, and is movable up and down on the lateral framework to compensate for variations in the thickness of the layer of fibrous material which is being extracted. It is conventional to journal the top roll in split bearings which are movable in guideways on the lateral frames. The guide-ways are straight and may be either vertical or obliquely inclined with respect to a vertical plane.

Because of the partial extraction of sugar juice during passage through the gap between the top roll and the feed roll, the material entering the gap between the bagasse roll and the top roll is much less voluminous than the cane fed to the mill. Therefore, the normal operative spacing of the roll in the first gap should be greater than that in the second gap. A spacing ratio of two to one is generally accepted as being most favorable.

When the guideways for the bearings of the top roll are vertical, the top roll is displaced in response to variations in the thickness of the layer of treated material in such a manner that the gap widths at the feed roll and at the bagasse roll change by practically equal amounts. When the guideways are obliquely inclined toward the feed roll at any practical angle, the widths of the gaps vary by different amounts but in a constant ratio which is much smaller than two to one. In either case, the desired gap ratio is available only at the thickness of the extracted layer for which the machine is designed, and the gap ratio is different from the optimum ratio at all other layer thicknesses, particularly when the rolls are near the position of simultaneous tangential engagement of the top roll with the feed and bagasse roll.

In the known arrangement, the most effective extraction of the sugar cane is possible only if a practically constant thickness of the layer fed to the machine is maintained. Any variation in the layer thickness inherently affects the rate of extraction.

The lateral forces exerted by the top roll on its bearings and by the bearings on the guideways are high and increase substantially whenever the thickness of the material being extracted deviates from the thickness for which the mill is designed. The direction of these forces also varies with the thickness of the extracted material and with the corresponding vertical shifting of the top roll.

The high contact pressure between bearing blocks and guide ways results in friction which interferes with the displacement of the top roll. The extraction pressure, therefore, reaches a maximum higher than the desired pressure when the top roll is moving upwardly and extraction is incomplete when the top roll is moving downward. Neither condition is conducive to maximum output of a product of uniform high quality.

The friction between top roll bearings and guideways may cause jamming and has been found to contribute significantly to premature fatigue failure in the mill frame, the bearings and the roll shafts.

The invention aims at a three-roll mill of the type described which avoids the shortcomings enumerated above.

The invention, in one of its aspects, achieves this object by mounting the two lower rolls on a supporting base for rotation about fixed axes, whereas the two ends of the third roll are journaled in respective pivotally mounted brackets. The pivots carrying the brackets preferably include an eccentric member which permits individual displacement of each pivot axis relative to the axis of the lower rolls. When the brackets swing on their pivots, the third roll moves in an arc about the pivot axes toward or away from a position of simultaneous engagement with the first and second rolls.

The exact nature of this invention as well as other objects and advantages thereof will be readily apparent from consideration of the following specification relating to the annexed drawing in which:

FIG. 3 shows a modification of a detail of the mill of FIG. 2;

FIG. 4 shows the device of FIG. 3 in axial section;

FIG. 5 illustrates a pivot arrangement of the mill of FIG. 1 in a side-elevational view on an enlarged scale;

FIG. 6 shows a portion of the apparatus of FIG. 5 in section on its pivot axis;

FIG. 7 shows a modification of the device of FIG. 6;

FIG. 9 illustrates geometrical relationships relevant to the three-roll mill of the invention;

FIG. 10 shows another three-roll mill according to the invention in front elevation, and partly in elevational section; and FIG. 11 shows the mill of FIG. 10 in side elevation, portions of the structure being broken away to reveal internal details.

Figure 1:
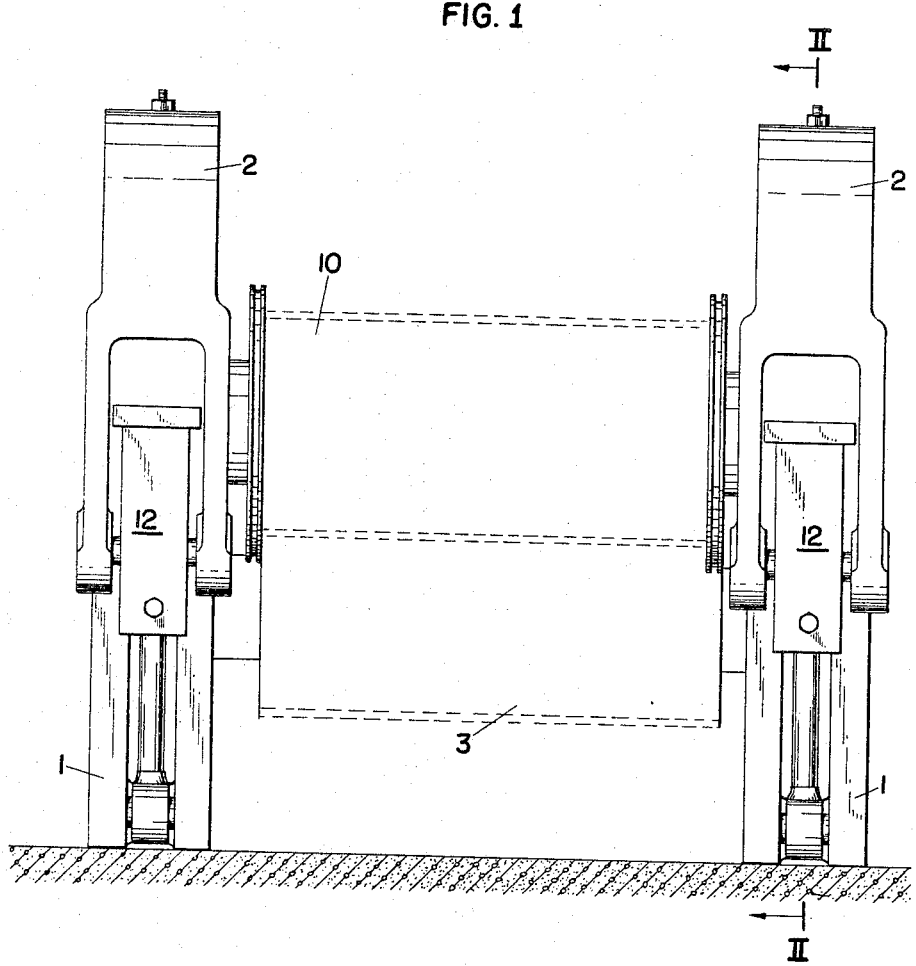
FIG. 1 shows a three-roll cane mill according to the invention in front elevation.
Figure 2:
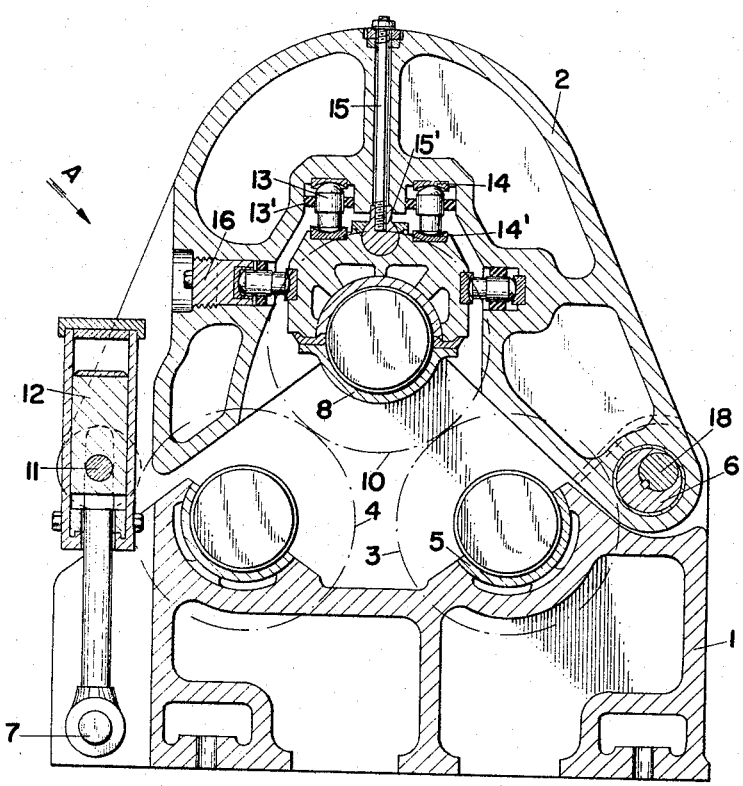
FIG. 2 is a side-elevational sectional view of the mill of FIG. 1, the section being taken on the line II—II in a plane which is radial with respect to the roller of the mill.

Referring now to the drawing in detail, and initially to FIGS. 1 and 2, there is seen a cane mill having two heavy lateral frames 1 of cast metal which are secured to the ground in a conventional manner, not further illustrated. A heavy bracket 2 is pivotally attached to each frame. One end portion of each bracket 2 has an opening in which a hollow bearing pin 6 is rotatably received. The pin is keyed to an eccentric shaft 18 which is rotatably mounted on the frame 1.

A bagasse roll 3 and a feed roll 4 are journaled in sleeve bearings 5 on the stationary frame 1 for rotation about fixed parallel axes extending in a common horizontal plane. Stub shafts at the two ends of the top roll 10 are respectively journaled in bearing blocks 8 mounted on the middle portion of each bracket 2. The other end portion of each bracket is attached by a pivot pin 11 to the cylinder of a hydraulic jack 12 the piston of which is secured to the stationary frame 1 by a pivot pin 7.

The hydraulic system for actuating the jacks 12 has not been illustrated since it may be entirely conventional. It may consist of a motor-driven constant-displacement pump, conduits connecting the pump to the jack 12, an adjustable pressure relief valve in the conduit to maintain a desired operating pressure, and such control valves and motor controls as are customary. The drive for the rolls of the mill need not differ from that employed in conventional three-roll mills. Any one, two or all of the rolls 3, 4, 10 may be connected to a drive motor by a suitable motion transmitting train. The manner in which the rolls are driven is not directly relevant to this invention and has, therefore, not been illustrated.

The top roll 10 is journaled in two split bearing blocks 8 of which one is seen in FIG. 2, the other one being substantially identical. Since the two brackets 2 are mounted on independent pivots, the axis of the top roll 10 may angularly deviate from its normal position parallel to the axes of the feed roll 4 and bagasse roll 3. Each bearing block 8 is attached to the corresponding bracket 2 by a universal joint assembly in order to permit such deviation.

A tie rod 15 is arranged in a bore of the bracket 2 which is normally vertical. The upper end of the tie rod 15 is secured against axial movement. The lower end of the rod carries a spherical member 15' movably secured in a conforming recess in the base of the bearing block 8, thus preventing downward movement of the block 8 under the force of gravity. Four abutment pins 13 are held in recesses of the bracket 2 by resilient rubber rings 13' which are interposed between the pins 13 and the walls of the respective recesses. The two ends of each pin are spherically rounded and engage spherically dished abutment members 14, 14' in the bottom of the corresponding bracket recess and on the bearing block base respectively. The radius of concave curvature of each abutment member 14, 14' is greater than that of the cooperating portions of the pins 13.

As seen in FIG. 2, the axes of two pins 13 are normally vertical and horizontally spaced from the vertical plane through the top roll axis in opposite directions. The axes of the other two pins extend in a common normally horizontal line. The horizontal pins abut against the base of the bearing block 8 from the opposite sides. The recesses receiving three of the four pins 13 are blind bores. The recess in which one of the horizontal pins 13 is received has a bottom formed by a removable threaded plug 16. After removal of the plug, the corresponding pin may be withdrawn outwardly, whereupon the bearing block may be released from the other pins upon loosening of the tie rod 15. The bearing arrangement may be assembled with the bracket 2 by reversing the aforedescribed operation.

The pins 13 and associated elements constitute a universal joint which permits the axis of the roll 10 to move angularly about its normal position to a sufficient extent in response to the pressure of a layer of extracted material the thickness of which varies in an axial direction.

A modified universal joint arrangement for the bearing blocks of the top roll 10 is illustrated in FIGS. 3 and 4 in radial and axial section, respectively. The base of the split bearing block 8' has an upper face of spherically curved shape. A conformingly shaped ball bearing 17 is interposed between the block 8' and a spherically concave bearing face 17' on the correspondingly modified bracket 2'. Two hooks 17" engage diametrically opposite portions of a shoulder on the cap of the bearing block. The hooks hold the block 8' in contact with the ball bearing 17' while permitting rotation of the block about a vertical axis and a horizontal axis perpendicular to the axis of the roller 10.

The pivotal connection between each bracket 2 and the corresponding frame 1 of the mill illustrated in FIGS. 1 and 2 is shown in more detail in FIGS. 5 and 6. An arm 19 is fixedly attached to the shaft 18. The shaft is journaled in the frame 1. Angular movement of the arm 19 thus causes rotation of the bearing pin which is eccentrically mounted on the shaft 18, and thereby shifts the position of the axis of pivotal movement of the associated bracket 2 on the frame 1. Two threadedly extensible rods 20 are hingedly attached to the free end of the arm 19. They engage portions of the stationary mill structure in a manner not further illustrated in order to secure a selected angular position of the arm 19, and thereby precisely to position the pivot axis of the respective bracket 2.

As shown in FIG. 6, a bearing sleeve 21 is interposed between the bearing pin 6 and the bracket 2, and is usually satisfactory when provided with heavy duty lubricant. In the modified pivot arrangement illustrated in FIG. 7, the sleeve is replaced by rings 22 of self-lubricating powder metal material conventional in itself.

Figure 8:
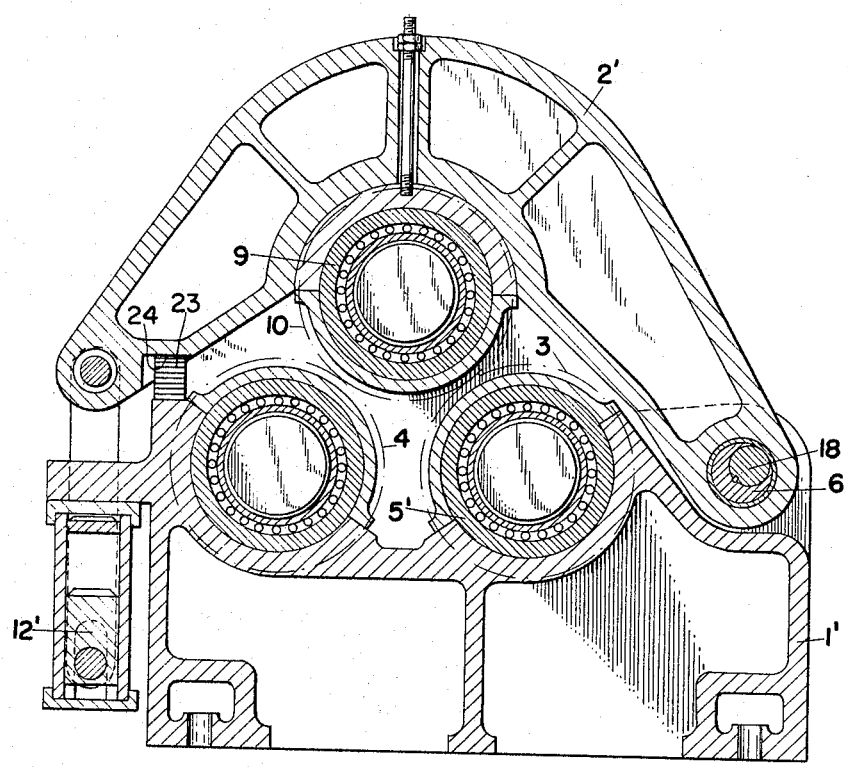
FIG. 8 shows a modified embodiment of the invention in a view corresponding to that of FIG. 2.

The cane mill shown in FIG. 8 in a view corresponding to FIG. 2 is similar to the first-described embodiment of the invention in most basic features. Roller bearings 5' are interposed between the feed and bagasse rolls 4, 3 and the frames 1'. The brackets 2' are connected with the frames 1' by a pivot arrangement including an eccentrically mounted bearing pin 6, and by a pressure fluid operated motor or jack 12' the cylinder of which is attached to the frame 1', whereas the piston is hinged to the bracket 2'. The sleeve bearing block 8 is replaced by a roller bearing assembly 9 in which the top roll 10 is journaled. An abutment 23 on the frame 1 cooperates with a corresponding flat face 24 on bracket 2' to limit movement of the top roll 10 toward the bagasse roll 3 and the feed roll 4 when the mill is idle. The face 24 is normally horizontal and does not interfere with adjustment of the shaft 18 by the eccentric bearing pin 6.

The mode of operation of both embodiments illustrated is the same, and is basically similar to that of conventional cane mills. The material to be extracted is fed to the mill in the direction of the arrow A into the gap between the top roll 10 and the feed roll 4. A portion of the sugar juice is extracted and flows into a non-illustrated trough. The residual material is passed through the gap between the top roll 10 and the bagasse roll 3. Additional juice is extracted during this second pass because of the narrower spacing of the roll in the second gap.

The width of the gap between rolls 10 and 3 is one half of the width of the gap between rolls 4 and 10. This relationship is maintained regardless of the actual thickness of the layer of extracted material and the ensuing movement of the top roll about the axis of the pivot pin 6. The geometrical relationships between the roll axes and the pivot axis of the brackets 2 which permit such operation are illustrated in FIG. 9.

In the diagrammatic representation of FIG. 9, the axis of rotation of the feed roll 4 is shown in section at $O_1$, the axis of the rotation of the bagasse roll 3 at $O_2$. The diameters of the three rolls 3, 4, 10 have the same length D. The axis of the roll 10 should be located on a curve each point of which is spaced from the feed roll axis $O_1$ a distance $D+2x$, and from the bagasse roll axis $O_2$ a distance $D+x$ for all significant values of $x$. The curve C satisfies this requirement.

The curve C is not a circle. The length B of the curve C which represents the path of the top roll axis for extreme thickness variations of the extracted material, however, is rather small. The curve portion B is not significantly different from a circular arc G having a radius R equal to the average radius of curvature of the cure portion B, and a center F near the centers of curvature of each element of the arc portion B. The spatial relationship of the axes of the rolls 3, 4 and of the pivot pin 6 is selected in accordance with the disposition of the points $O_1$, $O_2$, and F on the diagram of FIG. 9. The proper pivot axis for the brackets of a three-roll mill of the invention may thus readily be established from the known diameters of the rolls and from the known spacing of the lower rolls. Obviously, other gap ratios than 1:2 may be established in a mill if desired by following the above teachings. The method of establishing the position of F and the lenth of R may be modified in a manner obvious to those skilled in the art for three rolls having different diameters.

The rolls of a cane mill wear unevenly during use. They must be machined or ground to a smaller diameter from time to time in order to restore a cylindrical surface. As has been shown in connection with the diagram of FIG. 9, the roll diameters in part determine the proper location of the pivot axis for the brackets 2. As the rolls decrease in diameter during use and resurfacing, the pivot axis must be shifted if the desired relationship between the mill gaps is to be retained. The eccentric mounting of the pin 6 on the shaft 18 permits simple compensation for changes in roll diameter. The gap ratio may be varied by movement of the arm 19 without change in roll diameter, and changes in the gap ratio may be made very quickly and without significant loss in mill output.

The frictional forces which have been shown to be detrimental to the operation of mills having bearing blocks linearly slidable in guideways are virtually eliminated in the three-roll mill of the invention. The relative movement of the bracket 2 and the pivot pin 6 for a given vertical displacement of a top roll 10 is very much smaller in the mill of the invention than the relative sliding displacement of a bearing block and guideways in the conventional structure. The friction losses in the rotary arrangement of the invention are only an insignificant fraction of those in the known mills.

The ratio between the gap widths at the feed roll and at the bagasse roll can be maintained uniform from the position of simultaneous tangential engagement between the top roll and both bottom rolls to the maximum practical spacing of the rolls.

The eccentric adjustment of the bracket pivot is sufficient for all adjustments needed. The lower rolls thus may be mounted in fixed bearings for rotation about fixed axes without loss of versatility and adjustability of the mill. New and used rolls having different diameters may be jointly operated.

Several mills according to the invention, when operated in series as is customary in the cane sugar industry, may be adjusted for different gap ratios by turning their arm 19. The units installed at the feed end of the multiple mill arrangement are preferably adjusted for a gap ratio greater than 2, those near the bagasse discharge for a ratio smaller than 2. The optimum ratio for each unit is readily adjusted during a production run. The ratio set is maintained regardless of the variations in the thickness of the extracted material. The most favorable extraction conditions are thus ensured at all times.

FIGS. 10 and 11 illustrate a sugar can mill of the invention of a type particularly suitable for extreme heavy-duty installations in which eccentrics and similar adjustable pivot elements for the brackets which carry the top roll are difficult to construct and to maintain.

The illustrated mill has two heavy, stationary, lateral frames 30 on which the feed and bagasse rolls 31, 32 are rotatably supported. Two arcuately shaped brackets 33 are respectively secured to the frames 30 by normally coaxial pivot pins 34. The top roll 35 is suspended from the center portions of the brackets 33.

The trunnions of the lower rolls 31, 32 are journaled in semi-cylindrical bearing liners or brasses 37 which are adjustable on the respective frames 30 in such a manner that the axis of rotation of the supported trunnion moves in a circle. A sickle-shaped wedge 38 conformingly interposed between each brass 38 and the cylindrical face 39 of a groove in the associated frame 30 in which the bearing assembly is received has inner and outer faces of circularly arcuate cross section about respective parallel, radially offset axes. The axis of the inner face coincides with the axis of rotation of the associated roll. Flanges 38' on the wedges 38 prevent axial displacement of the latter.

Angular displacement of each wedge 38 is controlled by a tie rod 40 one end of which is hingedly secured to the wedge whereas the other end is threaded and passes freely through a pivot 41 on the frame 30. Paired nuts 40' on the threaded end of the tie rod abut against opposite faces of the pivot and permit the effective length of the rod to be adjusted. A stop 42 on the frames 30 engages a notch in a corresponding brass 37 and prevent its rotation.

The trunnions 43 of the top roll 35 are received in cylindrical bearing sleeves 44 which are attached to the brackets 33 by tie rods 45. A ball-and-socket arrangement 46 whose abuttingly engaged members are respectively mounted on the other end of the rod 45 and on the outer curved surface of the bracket 33 releasably secure each sleeve 45 and the corresponding trunnion 43 to the bracket.

A roller arrangement of the type discussed above, and omitted from FIGS. 10 and 11 for the sake of simplicity, transmits the pressure of the brackets 33 to the bearing sleeves 44. The bracket pressure is produced by two hydraulic jacks 47 whose cylinders are hingedly attached to respective frames 30, whereas the piston rods are pivotally secured to the free ends of the brackets 33. Apertured lugs 48 permit the brackets 33 together with the attached top roll 35 to be swung away from the lower rolls 31, 32 for maintenance operations.

A feeding trough 49, whose position may be adjusted by means of an eccentric crank 50 and a lever 51, and a packing roll 52 are provided for facilitating the feeding of sugar cane to the mill.

The normal operation of the mill illustrated in FIGS. 10 and 11 is so closely analogous to that of the earlier described embodiments of the invention as not to require description. The gaps between the feed roll 31 and the top roll 35 may be adjusted by varying the effective length of the tie rods 40 associated with the feed roll, whereby the associated wedge 38 is rotated about the axis of its outer face, and the axis of the inner face is shifted. The adjusted position of the wedge is secured by tightening the nuts 40' on the threaded end of the tie rod 40 against the pivot 41.

The brasses 37 may be omitted or replaced by antifriction bearing liners in an obvious manner. If so desired, the cylindrical shape of the face 39 and the corresponding shape of the outer face on the wedge 38 may be changed to a spherical contour to permit limited tilting movement of the axis of rotation of the feed roll. Such an arrangement results in less bearing wear when the center of roll 31 bends to a significant extent under the rolling pressure.

The gap between the bagasse roll 32 and the top roll 35 is adjusted by shifting the axis of rotation of the bagasse roll in the manner described above which reference to the feed roll 31, and the advantages of slightly spherical bearings are equally applicable.

The stationary supporting structure of the several mills of the invention carries the bearings of the feed and bagasse rolls only, and is therefore quite low so as not to obstruct the working area of the mill which is readily accessible by swinging the brackets with the top roll away from their operative position. The overall weight of the mill may be significantly decreased without loss in rigidity or durability.

It will be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:
1. A three-roll mill comprising, in combination:
   (a) a support including two bearing means having respective first and second axes, said axes being fixedly spaced relative to each other and extending in a predetermined direction;

(b) two rolls mounted on said bearing means respectively for rotation about said axes;
(c) bracket means mounted on said support for movement about a pivot axis in a plane transverse of said direction;
(d) a third roll supported on said bracket means for rotation about a third axis extending in said direction, and for movement toward and away from a position of simultaneous tangential engagement with said two rolls when said bracket means moves in said plane; and
(e) adjustment means for moving said pivot axis relative to said support in said plane.

2. A mill as set forth in claim 1, wherein said two rolls are spaced from each other in a radial direction, and said pivot axis is spaced from one of said two rolls in said radial direction away from the other one of said two rolls.

3. A mill as set forth in claim 1, further comprising pivot means connecting said bracket means and said support for movement of said bracket means about said pivot axis in said plane, said adjusting means including eccentric means for shifting said pivot axis.

4. A mill as set forth in claim 1, further comprising pivot means connecting said bracket means to said support for movement of said third roll away from said position of simultaneous engagement in a path about said pivot axis in which the spacing of said third roll from one of said two rolls is a substantially constant multiple of the spacing of said third roll from the other one of said two rolls when said bracket means moves in said plane.

5. A mill as set forth in claim 4, wherein the spacing of said third roll from said one roll is substantially twice the spacing of said third roll from said other roll.

6. A mill as set forth in claim 1, further comprising fluid pressure operated means for urging said bracket means to pivotally move in said plane toward said position of said third roll.

7. A mill as set forth in claim 6, wherein said bracket means has two portions, one of said portions being pivotally fastened to said support, and said pressure fluid operated means include a pressure fluid operated motor interposed between said support and the other portion of said bracket means, said other portion being spaced from said third roll in a direction away from said pivotally fastened bracket portion for urging said third roll toward said position thereof.

8. A mill as set forth in claim 1, wherein said bearing means include an anti-friction bearing interposed between each of said two rolls and said support, said rolls being journaled in the respective bearing.

9. A mill as set forth in claim 8, wherein said anti-friction bearings are fixedly secured on said support.

10. A mill as set forth in claim 8, wherein said anti-friction bearings are roller bearings.

11. A mill as set forth in claim 1, further comprising cooperating abutment means on said support and said bracket means for limiting movement of said third roll toward said position thereof.

12. A three-roll mill comprising, in combination:
(a) a support;
(b) two rolls mounted on said support for rotation about respective axes of rotation extending in a common direction;
(c) two pivot means on said support, each pivot means defining a pivot axis extending in said common direction and including adjusting means for shifting the associated pivot axis transversely of said direction;
(d) two brackets respectively mounted on said pivot means for movement about said pivot axes; and
(e) a third roll supported on said brackets for rotation about an axis normally extending in said common direction, and for arcuate movement about said pivot axes during said movement of said brackets toward and away from a position of simultaneous tangential engagement of said third roll with said two rolls.

13. A mill as set forth in claim 12, wherein said support, said pivot means and said brackets define a path of arcuate movement of said third roll in which the spacing of said third roll from one of said two rolls is a substantially constant multiple of the spacing of said third roll from the other one of said two rolls while said third roll moves away from said position of simultaneous engagement during said movement of said two brackets.

14. A mill as set forth in claim 12, wherein the spacing of said third roll from said one roll is substantially twice the spacing of said third roll from said other roll during said movement of said two brackets.

15. A mill as set forth in claim 12, wherein said common direction is substantially horizontal, and said two rolls are spaced horizontally from each other.

16. A mill as set forth in claim 12, further comprising universal joint means interposed between said third roll and each of said brackets for angular movement of the axis of said third roll from the normal position thereof.

17. A mill as set forth in claim 12, wherein said support is stationary, said mill further comprising fixed bearing means on said support for rotatably securing said two rolls.

18. A mill as set forth in claim 12, wherein said axes of rotation of said two rolls are fixed with respect to said support.

19. A three-roll mill comprising, in combination:
(a) a support;
(b) two rolls mounted on said support for rotation about respective axes of rotation extending in a common direction;
(c) pivot means on said support defining a pivot axis extending in said common direction;
(d) bracket means having a first portion mounted on said pivot means, and a second portion spaced from said first portion for arcuate movement about said pivot axis when said bracket means pivots about said pivot axis;
(e) a third roll;
(f) bearing means securing said third roll to said second portion of the bracket means for rotation of said third roll about another axis of rotation extending in said common direction, and for joint arcuate movement of said third roll with said second portion toward and away from said first and second rolls when said bracket means pivots about said axis; and
(g) adjusting means for adjusting the relative positions of said pivot axis and of said axes of rotation of said first and second rolls,
(h) said bearing means including a sleeve member rotatably receiving a portion of said third roll, a tie rod attached to said sleeve member, and cooperative abutment means on said tie rod and on said bracket means.

20. A mill as set forth in claim 19, wherein said abutment means include a ball member and a socket member movably receiving said ball member, said members being respectively mounted on said tie rod and on said bracket means.

21. A three-roll mill comprising, in combination:
(a) a support;
(b) two rolls mounted on said support for rotation about respective transversely spaced axes of rotation extending in a common direction;
(c) pivot means on said support defining a pivot axis extending in said common direction, said pivot axis being spaced from one of said two rolls in a direction away from the other roll;
(d) bracket means having a first portion mounted on said pivot means and a second portion spaced from said first portion for arcuate movement about said pivot axis when said bracket means pivots about the pivot axis on said pivot means;
(e) a third roll;

(f) bearing means securing said third roll to said second portion of the bracket means for rotation of said third roll about another axis of rotation extending in said common direction, and for joint arcuate movement of said third roll with said second portion toward and away from said first and second rolls when said bracket means pivots about said pivot axis;

(g) a presure fluid operated motor means operatively interposed between said support and said bracket means for pivoting said bracket means about said pivot axis and for thereby urging said third roll simultaneously toward said first and second rolls; and (h) adjusting means for adjusting the relative position of said pivot axis and said axes of rotation of said first and second rolls.

22. A mill as set forth in claim 21, wherein said adjusting means include shifting means for shifting the axis of rotation of at least one of said first and second rolls.

23. A mill as set forth in claim 22, wherein said shifting means include a bearing member formed with an opening therein, said bearing member having an inner face of circularly arcuate cross section about a first axis, and an outer face of circularly arcuate cross section about a second axis, said first and second axes being substantially parallel and radially spaced from each other, said one roll including a trunnion portion rotatably received within said inner face, and said outer face conformingly engaging a portion of said support, the shifting means further including means for securing said bearing member on said support in each of a plurality of angular positions relative to said second axis.

24. A mill as set forth in claim 23, wherein at least one of said faces is substantially cylindrical about the corresponding axis.

25. A mill as set forth in claim 23, wherein said trunnion portion is received within said inner face for rotation about said first axis.

26. A mill as set forth in claim 23, wherein said means for securing said bearing member include a rod member having two end portions attached to said bearing member and to said support respectively, and adjusting means for varying the effective length of said rod member.

27. A mill as set forth in claim 23, further comprising flange means on said bearing member and abuttingly engaging said support for securing said bearing member against axial movement relative to said support.

28. A mill as set forth in claim 23, further comprising a bearing liner contiguously interposed between said inner face of said bearing member and said trunnion portion, and stop means for securing said liner against rotation relative to said support.

29. A mill as set forth in claim 21, wherein said adjusting means include shifting means for shifting the axis of rotation of at least one of said first and second rolls substantially in a circle in a plane perpendicular to said axis.

30. A mill as set forth in claim 21, wherein said bracket means has a third portion spaced from said second portion in a direction away from said first portion, said motor means being interposed between said support and said third portion.

31. A mill as set forth in claim 21, wherein said bearing means include a bearing block, attaching means movably securing said block to said second portion of the bracket means, and a plurality of abutment members interposed between said bearing block and said second portion for limiting the movement of said bearing block relative to the bracket means, said abutment members being angularly spaced from each other relative to said other axis of rotation, said third roll being journaled in said bearing block.

32. A three-roll mill comprising, in combination:

(a) a support;

(b) two rolls mounted on said support for rotation about respective transversely spaced axes of rotation extending in a common direction;

(c) pivot means on said support defining a pivot axis extending in said common direction, said pivot axis being spaced from one of said two rolls in a direction away from the other roll;

(d) bracket means having a first portion mounted on said pivot means and a second portion spaced from said first portion for arcuate movement about said pivot axis when said bracket means pivots about the pivot axis on said pivot means;

(e) a third roll;

(f) bearing means securing said third roll to said second portion of the bracket means for rotation of said third roll about another axis of rotation extending in said common direction, and for joint arcuate movement of said third roll with said second portion toward and away from said first and second rolls when said bracket means pivots about said pivot axis; and (g) adjusting means for adjusting the relative position of said pivot axis and said axes of rotation of said first and second rolls.

References Cited

UNITED STATES PATENTS

| 21,601 | 9/1858 | Denney | 100—164 |
| 1,372,006 | 3/1921 | DeBruin | 100—164 X |
| 1,899,202 | 2/1933 | Kophe et al. | 100—166 |
| 2,199,297 | 4/1940 | Villasuso | 100—165 |
| 2,869,452 | 1/1959 | Tippet | 100—165 |

FOREIGN PATENTS

| 200,343 | 7/1923 | Great Britain. |
| 509,878 | 7/1939 | Great Britain. |

LOUIS O. MAASSEL, *Primary Examiner.*